United States Patent [19]
Liu et al.

[11] Patent Number: 5,363,287
[45] Date of Patent: Nov. 8, 1994

[54] LOW NOISE MULTI-OUTPUT AND MULTI-RESONANT FORWARD CONVERTER FOR TELEVISION POWER SUPPLIES

[75] Inventors: Rui Liu, Croton-On-Hudson; Paulo Caldeira, Scarsdale, both of N.Y.

[73] Assignee: Philips Electronics North America Corporation, New York, N.Y.

[21] Appl. No.: 203,964

[22] Filed: Mar. 1, 1994

[51] Int. Cl.[5] .................... H02M 3/335; H04N 5/63
[52] U.S. Cl. ........................................ 363/20; 348/730
[58] Field of Search .................... 363/15, 16, 20, 21, 363/95, 97, 101, 123, 131; 323/222, 224, 271, 282, 285, 286; 358/190

[56] References Cited
U.S. PATENT DOCUMENTS

| | | | |
|---|---|---|---|
| 4,692,852 | 9/1987 | Hoover | 358/190 |
| 4,709,319 | 11/1987 | Takahashi et al. | 363/20 |
| 4,788,591 | 11/1988 | Decraemer | 358/190 |
| 4,823,248 | 4/1989 | Ikeuchi et al. | 363/20 |
| 4,860,184 | 8/1989 | Tabisz et al. | 363/132 |
| 4,931,716 | 6/1990 | Javanovic et al. | 323/285 |

OTHER PUBLICATIONS

Tabisz et al., "Design of High-Density On-Board Single-and Multiple-Output Multi-resonant Converters", HFPC, May 1990 Proceedings, pp. 45–57.
Lee et al., "Nonresonant and Resonant Coupled Zero Voltage Switching Converters", IEEE Transactions on Power Electronics, vol. 5, No. 4, Oct. 1990, pp. 404–412.
Lee et al., "Recent Developments in High-Frequency Quasi-Resonant and Multi-Resonant Converter Technologies", EPE Aachen, 1989, pp. 401–410.
Nave, "Measuring, Suppressing, and Filtering Common Mode Emissions in Switched-Mode Power Supplies", HFPC, May 1989 Proceedings, pp. 285–292.
Hsiu et al., "Characterization and Comparison of Noise Generation for Quasi-Resonant and Pulse-Width Modulated Converters", Department of Electrical and Computer Engineering, Univ. of Arizona, 1991, pp. 504–509.

*Primary Examiner*—Emanuel T. Voeltz
*Assistant Examiner*—Matthew Nguyen
*Attorney, Agent, or Firm*—Edward W. Goodman

[57] ABSTRACT

A forward converter for supplying various output voltages for a television receiver includes a multi-resonant circuit, including a resonant inductor, a charging capacitor, and the output capacitors across each secondary winding of an output transformer. This arrangement relaxes the slopes of the voltages in the converter resulting in reduced radiated EMI. In addition, the values of the inductor and the capacitors are adjusted so that a switching transistor in the forward converter turns on at zero voltage and zero current so that the switching transistor is less stressed and the converter is capable of high frequency operation. The secondary providing high voltage includes the series arrangement of two oppositely conducting diode branches, each branch including the series arrangement of a high voltage diode and a Schottky diode. Finally, the switching signals applied to the switching transistor are subjected to a filter-delay to lessen the slope of the signals thereby also resulting in a reduction in the EMI radiated from the driving circuit.

8 Claims, 5 Drawing Sheets

LOW NOISE MULTI-OUTPUT AND MULTI-RESONANT FORWARD CONVERTER FOR TELEVISION POWER SUPPLIES

BACKGROUND OF THE INVENTION

1. Field of The Invention

The subject invention relates to power supplies capable of providing multiple voltage outputs and low electromagnetic interference (EMI) noise for use in television receivers.

2. Description of The Related Art

Typically, in television receivers, a PWM switched-mode power supply is used to supply these multiple output voltages. U.S. Pat. No. 4,788,591 discloses such a PWM switched-mode power supply. However, since the voltage and current waveforms associated with such a supply are substantially square waves, a significant amount of EMI noise is generated in the television receivers. In fact, it has become common practice to install snubber (filter) circuits throughout the power supply circuit in the television receiver to reduce ringing and, consequently, to reduce the radiated EMI noise from the supply.

To reduce EMI noise generated from and eliminate snubber circuits used in switched-mode power supplies, resonant power supplies with soft-switching (i.e., zero-voltage-switching or zero-current switching) have been introduced. FIG. 1 shows the circuit schematic of a multi-resonant and multi-output dc-to-dc converter power supply proposed in the article "DESIGN OF HIGH-DENSITY ON-BOARD SINGLE- AND MULTIPLE-OUTPUT MULTI-RESONANT CONVERTERS", by T. A. Tabisz and F. C. Lee, HFPC, May, 1990 Proceedings, pp. 45–57. Due to resonant phenomenon, currents and voltages present in this converter possess the sine-wave like shape except for the gate-to-source voltage of the MOSFET Q1 and the currents through the output rectifying diodes (D1–D6). Furthermore, all parasitics can be used in the converter design. Therefore, the amount of EMI noise generated in the converter is reduced and the snubber circuits are removed. However, the EMI noise generated in the driving circuit is still significant due to the square-wave voltage across the gate and source terminals of the MOSFET, and, consequently, a pulsating gate current with high di/dt is generated. To reduce the noise from the control circuit and the converter, the whole circuit is enclosed in a metal box for shielding, which is an expensive solution. It should be noted that the simple rectifying scheme used in the converter has potential switching losses and EMI noise problems when the converter is used for high output voltage applications, such as for a TV power supply where one output voltage is 130 volts. These problems are caused by the recovery time of high voltage rectifying diodes.

SUMMARY OF THE INVENTION

An object of the present invention is to provide a power supply for a television receiver which has multiple output voltages and exhibits reduced radiated EMI.

It is a further object of the invention to provide such a power supply having a low switching loss, low EMI noise, and at least one high voltage (>100 v.) output rectifying circuit.

Finally, it is another object of the present invention to provide such a power supply that is cost effective when compared to other prior art power supplies.

These objects are achieved in an improved multi-resonant and multi-output forward converter comprising an output transformer having a primary winding and at least two secondary windings each having a resonant capacitor and a series arrangement of two oppositely conducting diodes connected in parallel across the respective secondary winding for low output voltages (<50 V), and two oppositely conducting diode branches connected in parallel across the respective secondary winding for high output voltages (>50 V), each of said diode branches consisting of one high voltage fast recovery diode and one low voltage (100 V reverse voltage) Schottky diode, a dc voltage source having a first terminal coupled to one end of said primary winding, a switching circuit coupled between the other end of said primary winding and a second terminal of said dc voltage source, and a switching signal source coupled to said switching circuit for controlling the ON/OFF cycling of said switching circuit through a gate filter, said switching circuit comprising transistor switching means having a switching terminal connected to the output terminal of said gate filter for receiving a switching signal from said switching signal source, a source terminal coupled to the second terminal of said dc voltage source and the ground terminal of said gate filter, and a drain terminal coupled to the other end of said primary winding, and a parallel arrangement of a flyback diode and a charging capacitor coupled across the source and drain terminals of said transistor switching means, said gate filter comprising two resistors and one capacitor having one of their two ends connected together, the other end of the first resistor being connected to the first terminal of said switching signal source, the other end of the second resistor being connected to the switching terminal of said transistor switching means, and the second end of said capacitor constitutes the ground terminal of said gate filter, the multi-resonance of the forward converter including the resonant inductance and a combination of the capacitances of said output capacitors connected across the secondary windings and the capacitance of said charging capacitor.

Applicants have discovered that through the use of multi-resonance, the voltages and currents associated with the forward converter exhibit a sine-wave type shape, as opposed to a square-wave shape. As a result of this, there is less radiated EMI from the converter power stage. Furthermore, due to the reasons that the leakage inductance of the output transformer, junction capacitance of the switching transistor, and junction capacitances of the output rectifying diodes can be incorporated in the design of the resonant inductance and capacitances, the snubber circuits prevalent in a switch-mode TV power supply may be obviated.

In addition to the above, Applicants have proposed a new high voltage rectifying scheme by connecting one Schottky diode with 100 V reverse voltage in series with a fast recovery high voltage rectifying diode. In doing so, problems, such as diode current spikes and extra switching loss, caused by the recovery time of high voltage rectifying diodes if the simple rectifying scheme shown in FIG. 1 is used for high output voltages, can be overcome.

Furthermore, Applicants have obtained from the analysis of the converter that by properly designing the values of the resonant inductance and the charging and output capacitors, it can be arranged that the voltage across the switching transistor reaches zero and stays at zero for a certain period of time before the switching transistor needs to turn on. As a follow-on to this, a second-order gate filter can be employed to increase the rise and fall times of both the gate voltage and current. Thus, the radiated EMI generated by the driving circuit can be substantially reduced without increasing switching loss in the switching transistor.

BRIEF DESCRIPTION OF THE DRAWINGS

With the above and additional objects and advantages in mind as will hereinafter appear, the invention will be described with reference to the accompanying drawings, in which:

FIG. 3a shows the equivalent circuit of the circuit of FIG. 2, while

FIG. 7a shows a simple output rectifying circuit used in the circuit of FIG. 1, while

FIG. 8a shows the high voltage rectifying circuit of the subject invention, while

DESCRIPTION OF THE PREFERRED EMBODIMENTS

Figure 1:
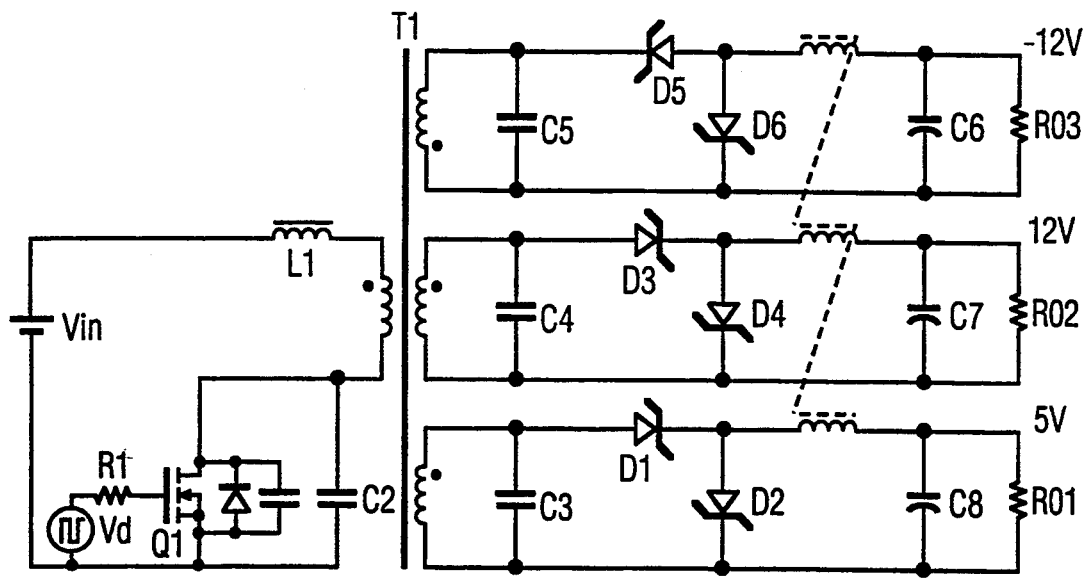
FIG. 1 shows a simplified circuit diagram of a prior art multi-resonant and multi-output forward dc-dc converter.
Figure 2:
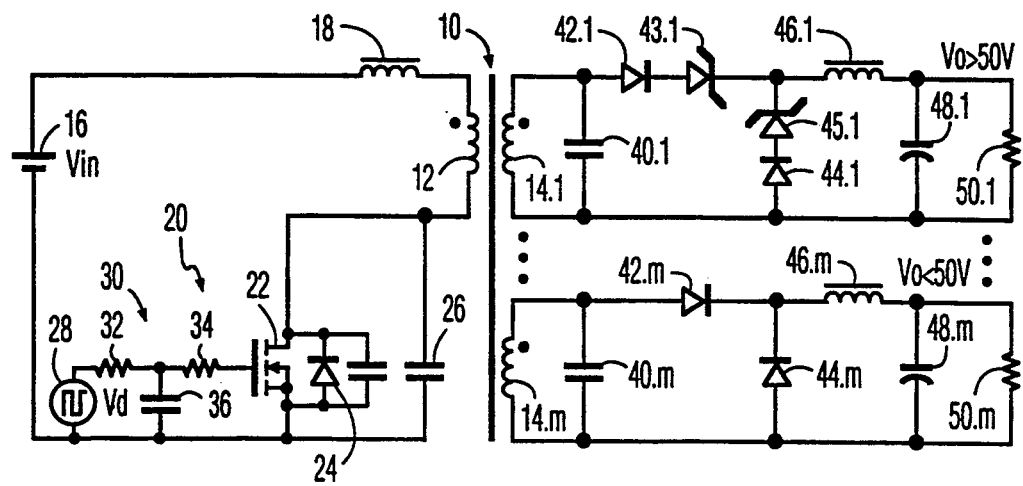
FIG. 2 shows a basic circuit diagram of the improved multi-resonant and multi-output TV power supply of the subject invention.

FIG. 2 shows a basic circuit diagram of the multi-resonant and multi-output forward converter of the subject invention. An output transformer 10 is shown having a primary winding 12 and a plurality of secondary windings 14.1–14.m. A source of dc voltage 16 is shown having its positive terminal connected through a resonant inductor 18 to one end of the primary winding 12. The negative terminal of the dc voltage source 16 is connected to the other end of the primary winding 12 through a switching circuit 20. The switching circuit 20 includes transistor switching means in the form of a MOSFET (Q1) 22 having a drain electrode connected to the other end of the primary winding 12 and a source electrode connected to the negative terminal of the dc voltage source 16. A parallel arrangement of a flyback diode (D1) 24 and a charging capacitor (C1) 26 are connected across the source and drain electrodes of the MOSFET 22. A switching signal source 28 is connected to the base of the MOSFET 22 through a gate filter 30. The gate filter 30 includes a first resistor 32 having one end connected to the positive terminal of the switching signal source 28 and the other end connected to one end of a second resistor 34 and one end of a capacitor 36. The other end of the resistor 34 is connected to the base of the MOSFET 22. Finally, the other end of the capacitor 36 is connected to the negative terminal of the switching signal source and the dc voltage source, and to the source electrode of the MOSFET 22.

Each secondary winding 14.m includes an output capacitor ($C_{2m}$) 40.m and the series arrangement of two oppositely conducting diodes (D2m/D3m) 42.m and 44.m (or diode branches including diodes 42.m, 43.m and 44.m, 45.m for high voltage rectifying) connected in parallel across the respective secondary winding. A filter circuit, including the series arrangement of an inductor ($L_{om}$) 46.m and a capacitor ($C_{om}$) 48.m, is connected across the diode 44.m (or diode branch 44.m and 45.m) in each secondary circuit, a load ($R_L$) 50.m being diagrammatically shown connected across each capacitor 48.m.

In order to properly design the converter circuit, the following information has to be obtained in the steady state analysis:

The total secondary resonant capacitance, i.e., $C_2 = f(n_1, n_2, \ldots, n_m,$ and $C_{21}, C_{22}, \ldots, C_{2m})$, Conditions for zero-voltage switching, Output regulation as functions of input voltage and output load, Component stress.

To simplify the steady state analysis, the following conditions are assumed:

One output and the turn ratio ($n_1$) of the output transformer is 1:1, hence the transformer is eliminated and $C_2 = C_{21}$, $D2 = D2m$, $D3 = D3m$.

The switching devices Q1, D1, D2 and D3 are ideal. Q1 is switched at a constant-off time to ensure the zero-voltage and zero-current turn-on.

The inductance of the output filter inductor $L_o$ is large enough so that the output current $I_o$ can be considered as constant.

The converter circuit is loss-less.

Figure 3A:
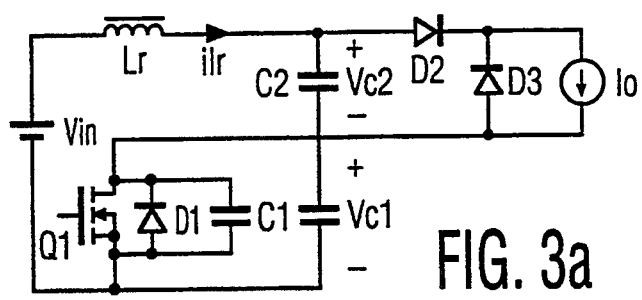
Figure 3B:
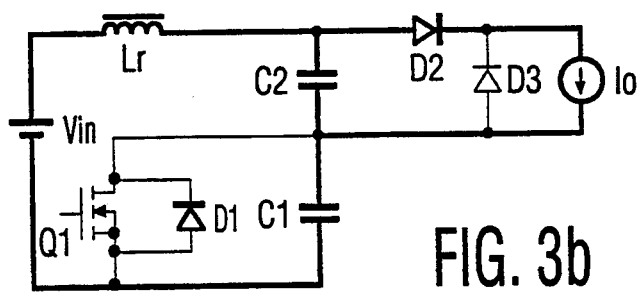
FIGS. 3b–3e depict the four linear circuit modes of the switching states of Q1, D1, D2 and D3.
Figure 3C:
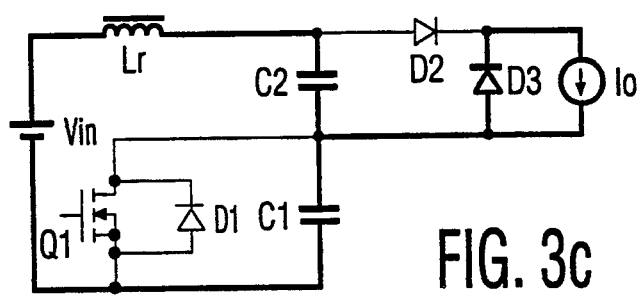
Figure 3D:
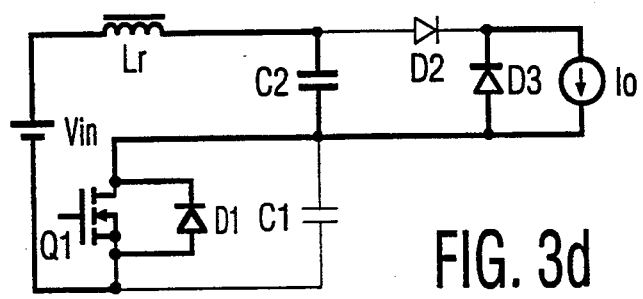
Figure 3E:
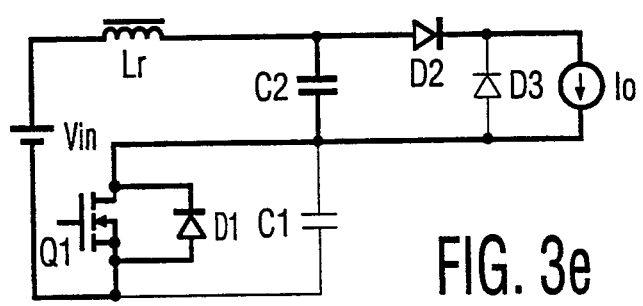

From the third assumption, the output circuit consisting of $L_o$, $C_o$ and $R_o$ can be replaced by a constant current source $I_o$. Thus, the equivalent circuit of the circuit shown in FIG. 2 can be obtained based on the above assumptions and is shown in FIG. 3a. This equivalent circuit possess four linear circuit modes depending on the switching states of Q1, D1, D2 and D3, and the polarity of $v_{c2}$, as shown in FIGS. 3b–3e. Table 1 shows the conditions for the occurrence of each circuit mode. In this table, it is assumed that $t_0$ is the time when Q1 is turned off, $t_1$ is the time when $v_{c2}$ becomes negative, $t_2$ is the time when $v_{c2}$ reaches zero, and $t_3$ is the time when $v_{c2}$ becomes positive again.

TABLE 1

| CONDITIONS FOR OCCURRENCE OF EACH CIRCUIT MODE | | | | | |
|---|---|---|---|---|---|
| Circuit Mode | Q1 | D1 | D2 | D3 | Conditions |
| M1 | Off | Off | On | Off | Q1 is turned off at $t_0$ |
| M2 | Off | Off | Off | On | $v_{c2}$ = negative at $t_1$ |
| M3 | Off | On | Off | On | $v_{c2}$ = at $t_2$ |
|    |    |    |    |    | Q1 turned on/D1 conducts |
| M3 | On | Off | Off | On | $i_{lr} > 0$ |
| M4 | On | Off | On | Off | $v_{c2} \geq 0$ |
|    |    |    |    |    | $i_{lr} > I_o$ at $t_3$ |
| M5 | On | Off | On | On | $i_{lr} > I_o$ at $t_3$ |

While the above-noticed transistor switching means has been shown and described as MOSFET 22, it should be noted that, alternatively, the transistor switching means may be a bipolar junction transistor (BJT) or an insulated gate bipolar transistor (IGBT).

Figure 4:
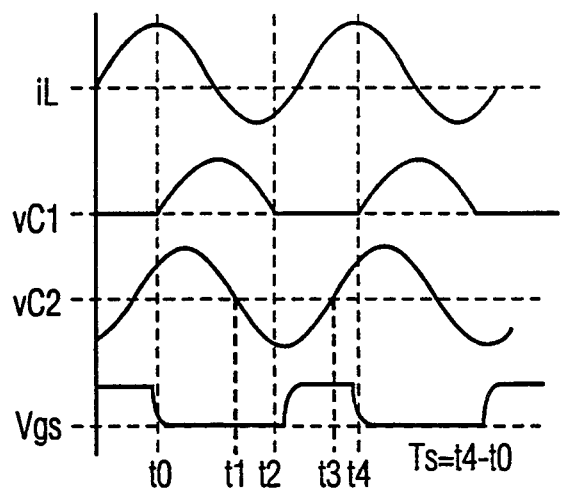
FIG. 4 shows various waveforms in the equivalent circuit diagrams of FIGS. 3a–3e.

The zero-voltage switching condition of this converter is accomplished by connecting Q1, D1 and C1 in parallel. Transistor Q1 is turned off at non-zero current. Due to the charge of C1, the voltage across Q1, i.e. $v_{c1}$, will not be built up immediately, thus resulting in a capacitively snubbed turn-off. Once Q1 is off, it should be turned on only when the flyback diode D1 is conducting to achieve zero-voltage and zero-current turn on. Therefore, it is necessary to derive information such that the time interval during which D1 is conducting is known. Waveforms of typical currents and voltages over one switching period $T_S$ and the time intervals associated with each circuit mode for the operation sequence M1-M2-M3-M4 are shown in FIG. 4.

Figure 5A:
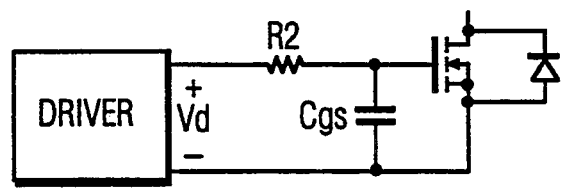
FIG. 5a shows a prior art gate drive circuit.
Figure 5B:
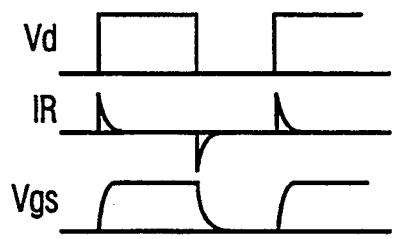
FIG. 5b shows various voltage and current waveforms therein.
Figure 6A:
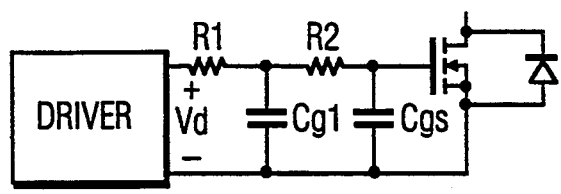
FIG. 6a shows the gate filter circuit of the present invention.
Figure 6B:
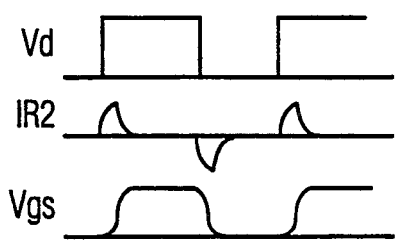
FIG. 6b shows the various voltage and current waveforms therein.

A common practice to reduce the radiated EMI noise from the driving circuit is to add a resistor R in series between the IC driver and the gate of the MOSFET as shown in FIG. 5a, where waveforms of the gate current and voltage are depicted in FIG. 5b. Such a method is sufficient for passing EMI regulations, but the amount of EMI noise is still high enough to appear on a television screen due to the sharp di/dt of the gate current as seen in FIG. 5b. A large value of R can be used but this causes more power dissipation in the MOSFET. A new second-order RC gate filter is proposed in FIG. 6a where $C_{gs}$ is the gate-to-source junction capacitance of the MOSFET. Due to the second-order resonance, the gate current possesses the damped sine-wave shape without increasing the power loss in the MOSFET due to ZVS, resulting in a significant noise reduction in the driving circuit. It should be noted that the current, shown in FIG. 6b, through resistor R1 still possesses the shape as shown in FIG. 5b. However, noise generated by this current can be easily reduced by placing the resistor R1 and the capacitor $C_{g1}$ close to the IC driver to minimize the current path.

Figure 7A:
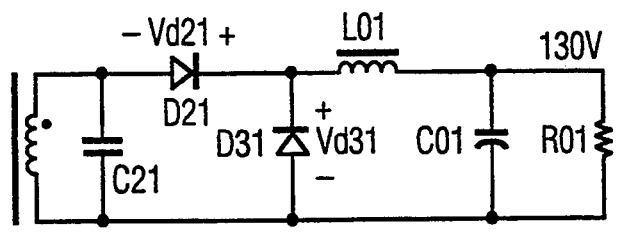
Figure 7B:
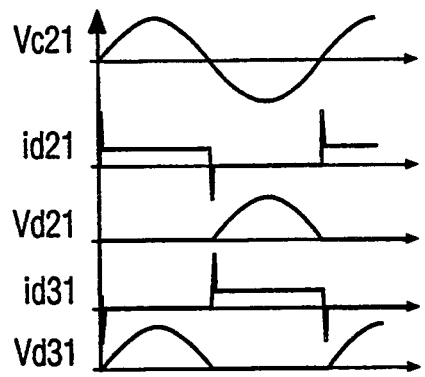
FIG. 7b shows various voltage and current waveforms therein.
Figure 8A:
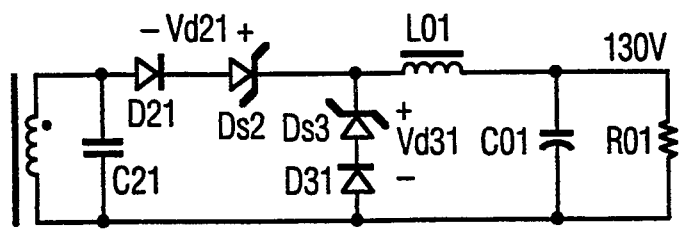
Figure 8B:
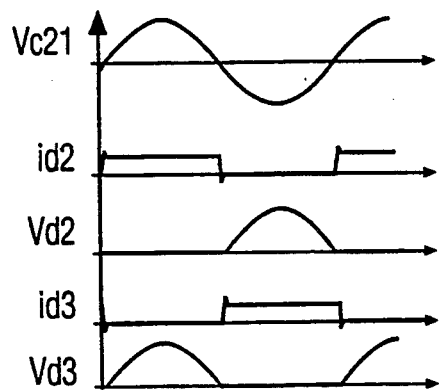
FIG. 8b shows the associated voltage and current waveforms therein.

As shown in FIG. 7a, due to the recovery time of high voltage (>50 V) rectifying diodes, a short circuit across the secondary winding of high output voltage (>50 V) may appear during the transition when D2m and D3m exchange their conducting status, resulting in a large current spike. Such a current spike will not only cause extra power loss in the rectifying diodes, but also generate significant amounts of EMI noise. A novel rectifying circuit for high output voltages and low EMI noise is proposed in FIG. 8a, where the 100 V Schottky diodes $D_{s2m}$ and $D_{s3m}$ are added in series with the fast recovery high voltage diodes D2m and D3m. The operation principle is given as follows: assume that the diode branch $D_{s2m}$/D2m is going to turn off and the diode branch $D_{s3m}$/D3m is going to turn on. When $V_{c2m}$ reaches zero and is going negative, $D_{s2m}$ is off and D2m is in the recovery stage. When $V_{c2m}$ becomes negative, $D_{s3m}$ and D3m are on and $V_{c2m}$ is dropped on $D_{s2m}$ because D2m has not recovered yet. However, there is no short circuit due to the turn-off of $D_{s2m}$, therefore, no current spike appears. Since $V_{c2m}$ has a sinusoidal-like waveform, the voltage across $D_{s2m}$ builds up slowly during the recovery period of D2m. When D2m has recovered, $V_{c2m}$ is mostly dropped on D2m due to its smaller junction capacitance when compared to that of $D_{s2m}$. Thus, $D_{s2m}$ is never over stressed even though its maximum reverse voltage is only 100 V. This is also true for $D_{s3m}$.

Based on the following design specifications:
Input Voltages—$V_{in,min}$=115 V and $V_{in,max}$=185 V;
Output Voltage—$V_{o1}$=130 V and $V_{o2}$=23 V;
Load Currents
$I_{o1}$=1.20 A and $I_{o2}$=1.30 A (full load)
$I_{o1}$=0.6 A and $I_{o2}$=0.65 A (half load)
Switching Freq.—500 kHz.
it has been determined that:
L≅37 μH
C1≅1 nF
C2≅2.97 nF
While the design of the resonant circuit is complete, the converter has only one secondary side and the value of C2 is assumed at the primary side. These results must now be converted into a two- (or more) output case with secondary resonance.

The turn ratio $n_2$ for the 23 V output is given by the following equation:

$$n_2 = \frac{V_{in,min}M}{V_{o2}} = 3$$

where M, the converter voltage gain, is selected to be 0.565. Furthermore, the turn ratio $n_1$ for the 130 V output is similarly given by the following equation:

$$n_1 = \frac{V_{in,min}M}{V_{o1}} \approx 0.5$$

The values of $C_{21}$ and $C_{2m}$ can be determined from the following equation:

$$C_2 = \frac{C_{21}}{n_1^2} + \frac{C_{2m}}{n_2^2} \text{ and } \frac{C_{21}}{C_{2m}} = \frac{P_{o1}}{P_{o2}} \cdot \frac{n_1^2}{n_2^2}$$

where $P_{o1}$ is the output power at the first secondary, and $P_{o2}$ is the output power at the second secondary giving: $C_{21}$=655 pF and $C_{2m}$=3.15 nF.

Figure 9:
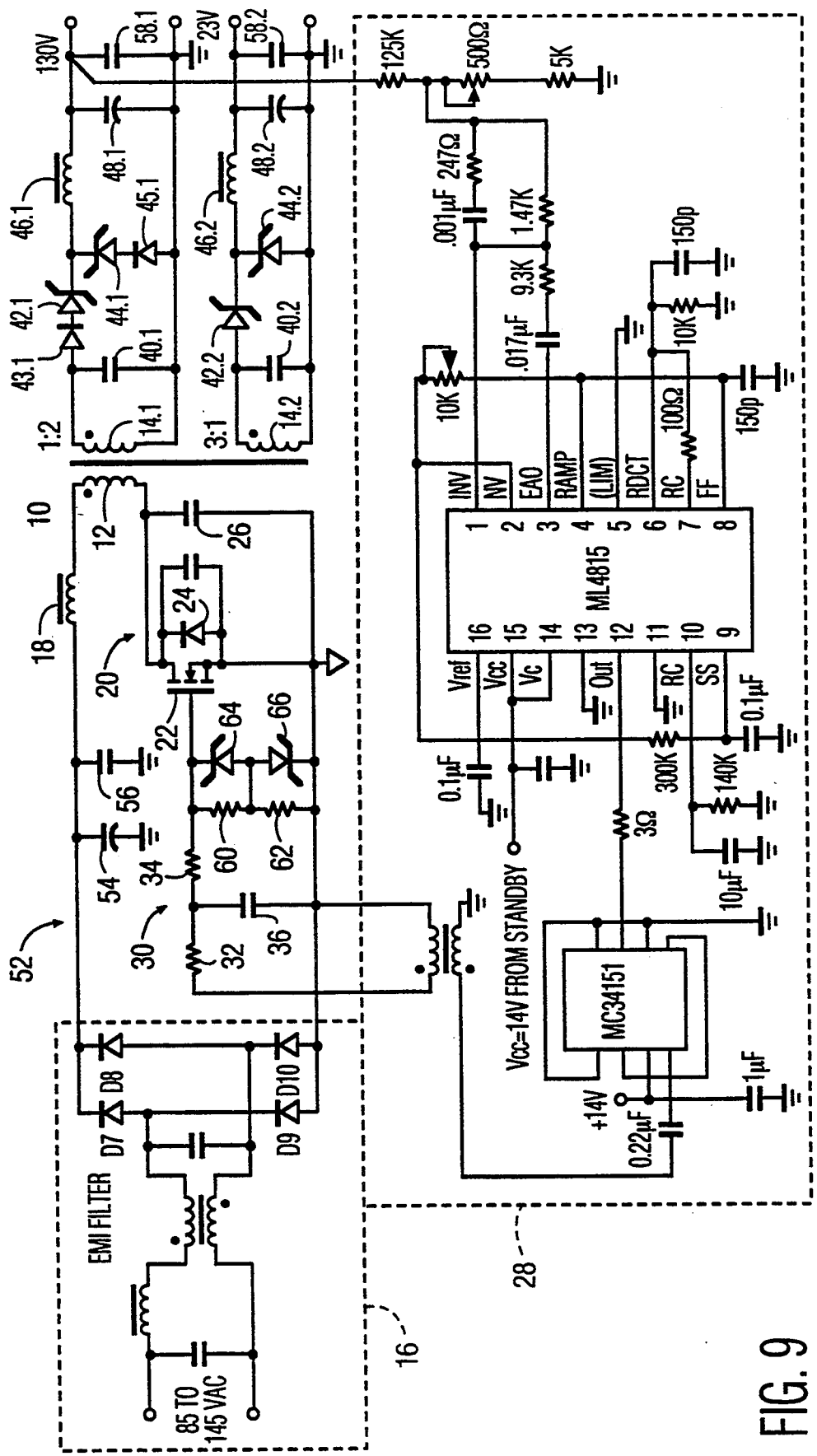
FIG. 9 shows a practical circuit diagram of the forward converter of the subject invention.

FIG. 9 shows a practical embodiment of the multi-resonant and multi-output forward converter of the subject invention for off-line applications. In such applications, the dc voltage source 16 shown in FIG. 2 is obtained by rectifying a low frequency AC line voltage, for example, 50 Hz or 60 Hz, through an input circuit 16 consisting of an EMI filter, a full-wave rectifier, and an energy storage capacitor as shown in FIG. 9. In the input circuit 16, said EMI filter is employed to filter out the high frequency noise generated by the high frequency operation of the multi-resonant and multi-output forward converter. The ac line voltage is rectified by said full-wave rectifier to produce a pulsatory dc voltage which is smoothed by said energy storage capacitor 54. It should be noted that the capacitor 56, connected in parallel with the energy storage capacitor 54, is used for EMI noise filtering purposes. In addition, a further output capacitor 58.1/58.2 has been added in parallel to the output capacitor 48.1/48.2 in the filter circuit on each secondary winding 14.1/14.2, the output voltage being taken across capacitor 48.1/48.2. In addition to the above, it should be noted that the flyback diode (D1) 24 has been eliminated and effectively replaced by the internal diode of the MOSFET (Q1) 22. The gate filter 30 also includes the series arrangement of two resistors 60 and 62 connecting the gate terminal of MOSFET 22 to ground and the series arrangement of two oppositely arranged zener diodes 64 and 66 also connecting the gate terminal to ground, the junction points between the resistors 60, 62 and the zener diodes 64, 66 being interconnected.

The values of each of the components are as follows:

Inductors:
18 ($L_r$)—33.0 μH
46.1 ($L_{o1}$)—760 μH
46.2 ($L_{o2}$)—230 μH

Capacitors:
26 (C1)—750 pF
36—470 pF
40.1 ($C_{21}$)—650 pF
40.2 ($C_{22}$)—3.15 nF
48.1 ($C_{o1}$)—10 μF
48.2 ($C_{o2}$)—47 μF
54—330 μF
56—0.1 μF
58.1—0.1 μF
58.2—0.1 μF Resistors:
32—120 ohms
34—56 ohm
60—1 kohms
62—1 kohms Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A multi-resonant and multi-output forward converter comprising an output transformer having a primary winding and at least two secondary windings each having a resonant capacitor and a series arrangement of two oppositely conducting diodes connected in parallel across the respective secondary winding for low output voltages (<50 V), and two oppositely conducting diode branches connected in parallel across the respective secondary winding for high output voltages (>50 V), each of said diode branches consisting of one high voltage fast recovery diode and one low voltage (100 V reverse voltage) Schottky diode, a dc voltage source having a first terminal coupled to one end of said primary winding through a resonant inductance, a switching circuit coupled between the other end of said primary winding and a second terminal of said dc voltage source, and a switching signal source coupled to said switching circuit for controlling an ON/OFF cycling of said switching circuit through a gate filter, said switching circuit comprising transistor switching means having a switching terminal connected to an output terminal of said gate filter for receiving a switching signal from said switching signal source, a source terminal coupled to the second terminal of said dc voltage source and a ground terminal of said gate filter, and a drain terminal coupled to the other end of said primary winding, and a parallel arrangement of a flyback diode and a charging capacitor coupled across the source and drain terminals of said transistor switching means, said gate filter comprising two resistors and one capacitor having one of their two ends connected together, the other end of the first resistor being connected to the first terminal of said switching signal source, the other end of the second resistor being connected to the switching terminal of said transistor switching means, and the second end of said capacitor constitutes the ground terminal of said gate filter, the multi-resonant circuit of the forward converter including the resonant inductance and a combination of the capacitances of output capacitors connected across the secondary windings and the capacitance of said charging capacitor.

2. A multi-resonant and multi-output forward converter as claimed in claim 1, characterized in that said transistor switching means is a MOSFET.

3. A multi-resonant and multi-output forward converter as claimed in claim 2, characterized in that said flyback diode comprises an internal diode of said MOSFET.

4. A multi-resonant and multi-output forward converter as claimed in claim 1, characterized in that said transistor switching means is a BJT.

5. A multi-resonant and multi-output forward converter as claimed in claim 1, characterized in that said transistor switching means is an IGBT.

6. A multi-resonant and multi-output forward converter as claimed in claim 1, characterized in that an LC filter, including a series arrangement of an inductor and a capacitor, is coupled in parallel across a second of the two oppositely arranged diodes arranged across each respective secondary winding, an output from each of said windings being taken across the capacitor in the respective LC filter.

7. A multi-resonant and multi-output forward converter as claimed in claim 1, characterized in that in the respective secondary windings for high output voltages, each of the diode branches includes the series arrangement of a Schottky diode and a high voltage rectifying diode.

8. A multi-resonant and multi-output forward converter as claimed in claim 1, characterized in that a second-order RC filter, including a T arrangement of two resistors and one capacitor, is coupled in series between the output of the switching signal source and the switching terminal of the transistor switching means.

* * * * *